(No Model.) 4 Sheets—Sheet 1.
J. H. PENDLETON.
TRACTION DEVICE FOR CABLE RAILWAYS.
No. 350,078. Patented Sept. 28, 1886.
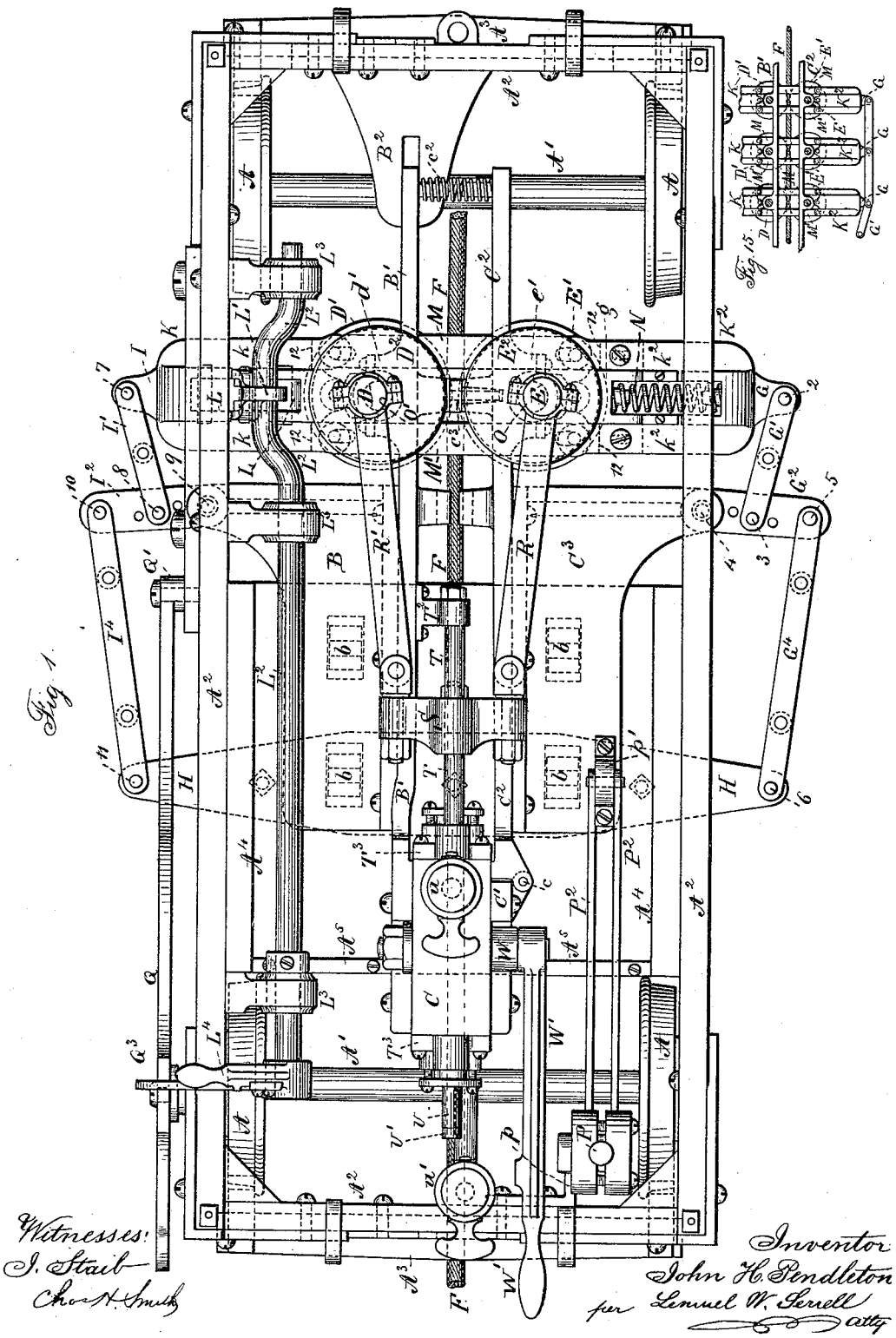
Witnesses:
J. Staib
Chas H. Smith
Inventor
John H. Pendleton
per Lemuel W. Serrell
atty
N. PETERS, Photo-Lithographer, Washington. D. C.

(No Model.) 4 Sheets—Sheet 2.
J. H. PENDLETON.
TRACTION DEVICE FOR CABLE RAILWAYS.
No. 350,078. Patented Sept. 28, 1886.
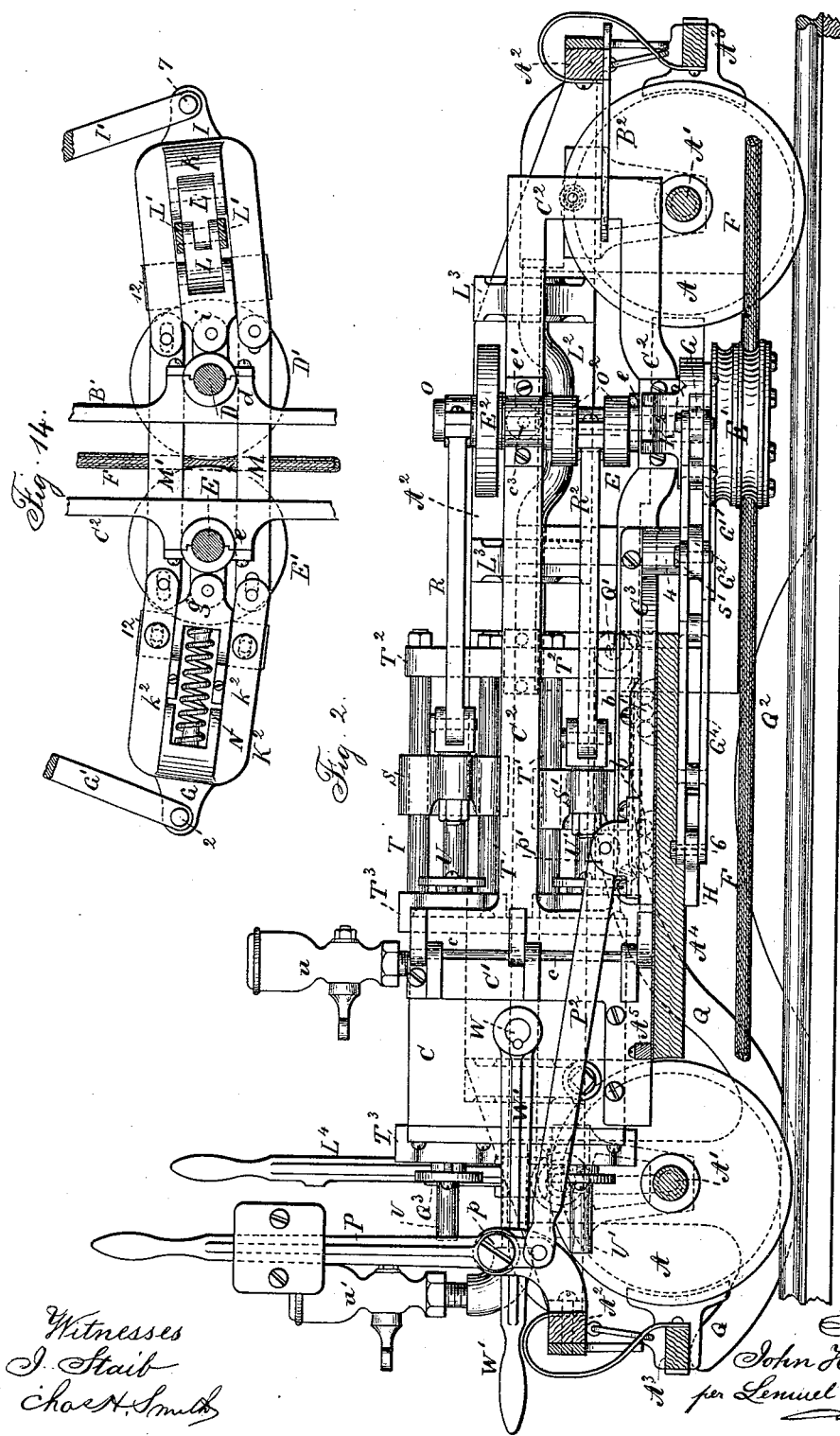
Witnesses
J. Staib
Chas. H. Smith
Inventor
John H. Pendleton
per Lemuel W. Serrell
atty (No Model.) 4 Sheets—Sheet 3.
J. H. PENDLETON.
TRACTION DEVICE FOR CABLE RAILWAYS.
No. 350,078. Patented Sept. 28, 1886.
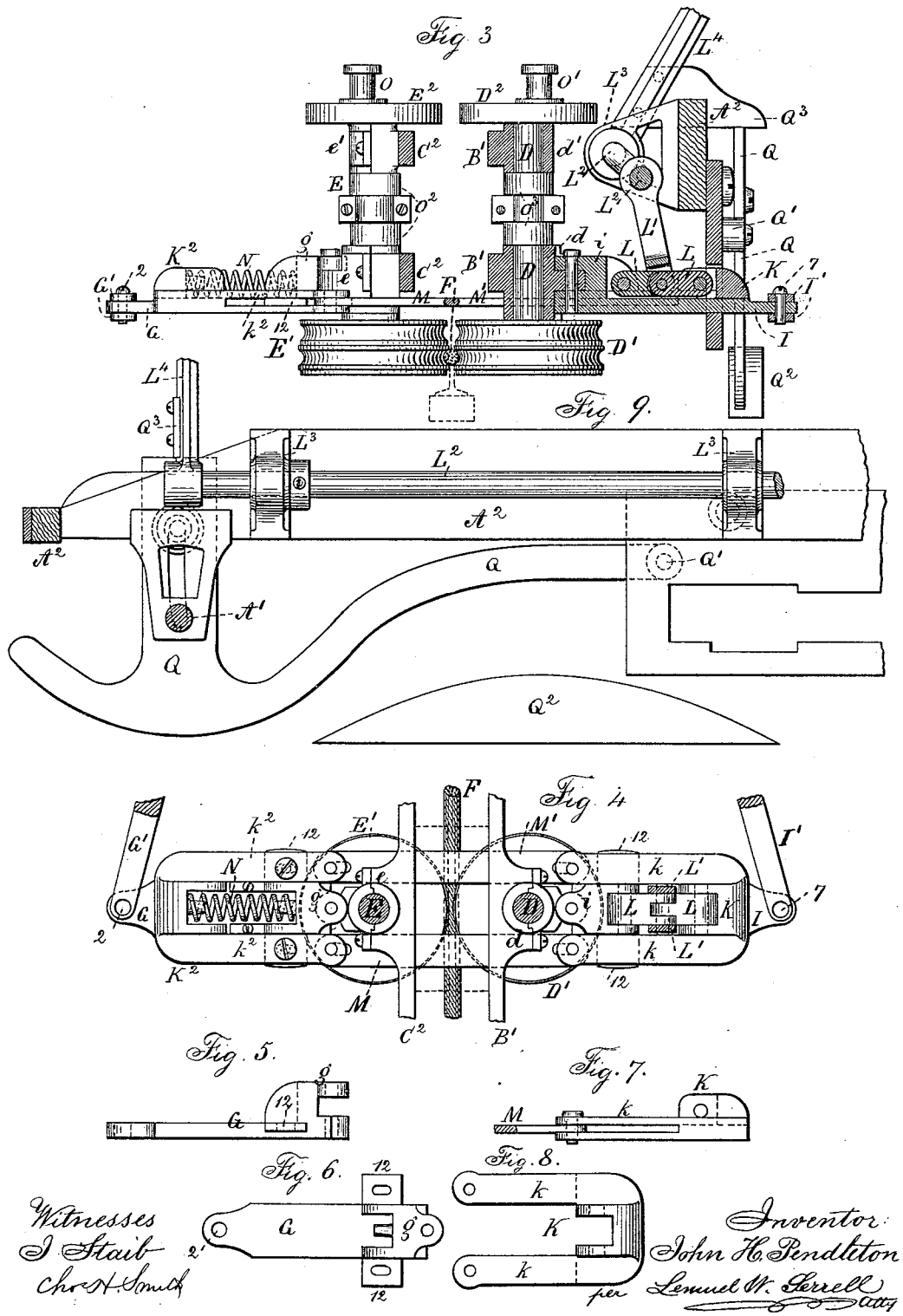
Witnesses
J. Staib
Chr. H. Smith
Inventor
John H. Pendleton
per Lemuel W. Serrell
atty (No Model.) 4 Sheets—Sheet 4.
J. H. PENDLETON.
TRACTION DEVICE FOR CABLE RAILWAYS.
No. 350,078. Patented Sept. 28, 1886.
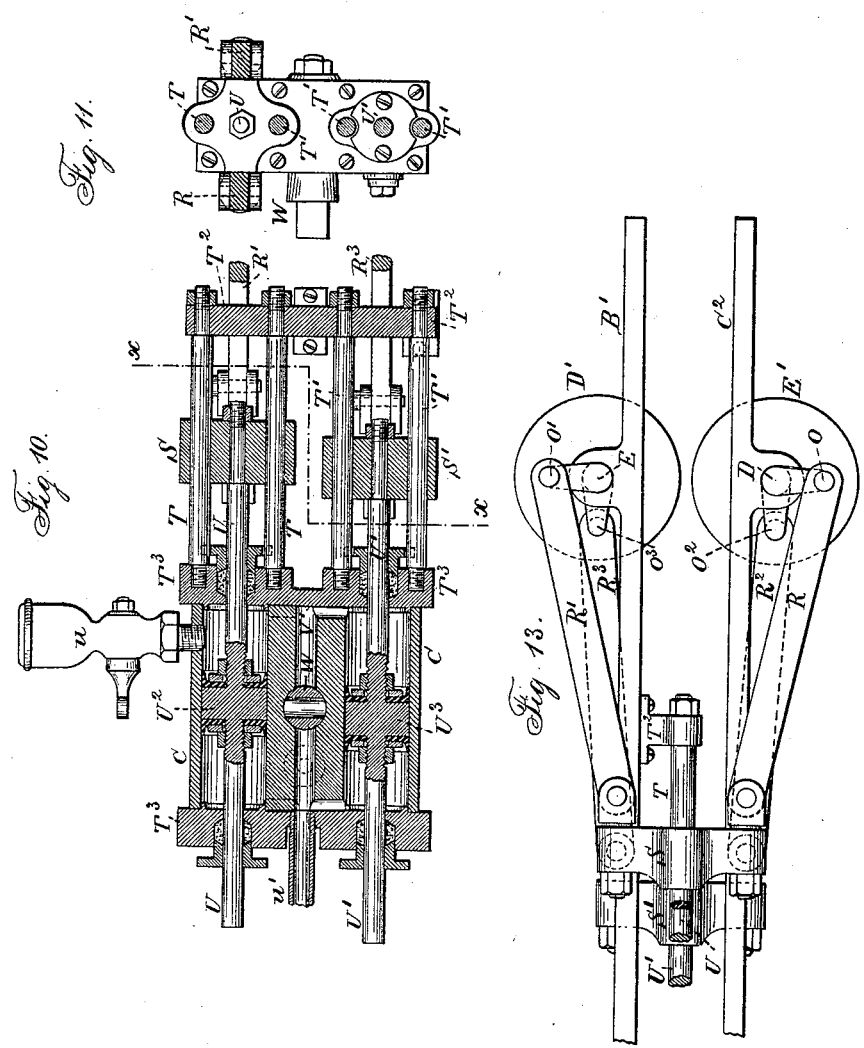
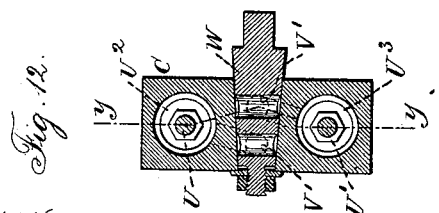
Witnesses:
J. Staib
Chas H. Smith
Inventor
John H. Pendleton
per Lemuel W. Serrell
Atty

UNITED STATES PATENT OFFICE.

JOHN H. PENDLETON, OF BROOKLYN, NEW YORK, ASSIGNOR, BY DIRECT AND MESNE ASSIGNMENTS, TO HIMSELF, CORNELIUS TIERS, ALEXANDER H. TIERS, ROBERT I. SLOAN, AND LINCOLN MOSS, ALL OF NEW YORK, N. Y., AND THOMAS NAST, OF MORRISTOWN, NEW JERSEY.

TRACTION DEVICE FOR CABLE RAILWAYS.

SPECIFICATION forming part of Letters Patent No. 350,078, dated September 28, 1886.

Application filed December 15, 1885. Serial No. 185,687. (No model.)

*To all whom it may concern:*

Be it known that I, JOHN H. PENDLETON, of Brooklyn, in the county of Kings and State of New York, have invented an Improvement in Traction Devices for Cable Railways, of which the following is a specification.

The object of this present invention is to control the revolution of wheels that are pressed against opposite sides of a traveling cable, so that said wheels may freely revolve by the movement of the cable while the car or vehicle remains stationary, and when a gradual detaining device is brought into action to stop the rotation of the wheels the traveling cable gives motion to the vehicle.

In carrying out my said invention I make use of a carriage connected to the truck or platform of the car, and upon this carriage I mount the two wheels between which the cable passes, and I make use of swinging bearings for one of the wheels, to allow the wheels to be separated and the cable dropped, or said wheels are brought together and the cable firmly grasped between them by a peculiar mechanism. Upon the shafts of the wheels there are cranks with connecting-rods to pistons moving in cylinders containing oil or other liquid. There are channels or ports connecting the opposite ends of these cylinders, and cocks or valves in the said channels. When these cocks or valves are opened, the liquid circulates freely from one end to the other of the cylinders as the pistons reciprocate; hence there is little or no detention to the wheels that are revolved by the traveling cable, and the car can remain stationary; but as the cocks or valves are gradually closed the circulation of the oil or other liquid is obstructed, and the wheels not revolving freely cause the cable to move the car along on the track, and when the cocks are closed the wheels are held so that they do not revolve and the car receives a motion corresponding to the speed of the cable. By this improvement I am enabled to employ a rapidly-traveling cable, and to graduate the speed of the car at will, and there is no unnecessary wear or injury to the cable, because the same does not slip upon the wheels, but the surfaces of the wheels move at the same speed as the cable.

Some portions of my improvements not necessarily being connected with the mechanism for propelling the car form the subject of a separate application.

In the drawings, Figure 1 is a general plan of the mechanism made use of. Fig. 2 is an elevation with the frame and wheels removed to show the parts that would be behind them. Fig. 3 is an elevation of the wheels and a section of the toggle mechanism that clamps the wheels upon the cable. Fig. 4 is a detached plan of the wheels and clamping mechanism. Fig. 5 is a side view of the jaw and bed-piece for the link-frame, and Fig. 6 is a plan of the same. Fig. 7 is a side view of the link-frame, and Fig. 8 is a plan of the same. Fig. 9 is an elevation of the cam mechanism for dropping the cable automatically. Fig. 10 is a section longitudinally of the cylinders with the pistons and cross-heads that act to detain or stop the wheels that are in contact with the cable. This section is at the line $y$ $y$, Fig. 12. Fig. 11 is an end view of such cylinders with the rods and connections in section at the line $x$ $x$, Fig. 10. Fig. 12 is a cross-section of the cylinders at the regulating cock or valve. Fig. 13 is a diagrammatic view of the cranks and connecting-rods. Fig. 14 is a detached plan view of the gripping mechanism, with the link-frames and bed-pieces at inclinations; and Fig. 15 is a detached view, in miniature, illustrating the grip with three pairs of wheels.

A A represent the wheels, A' the axles, A² the frame, of a truck or car of any desired size or character; and A³ shows the brake bars and shoes, which may be of ordinary construction.

A⁴ is a bed-plate extending across from one side frame, A², to the other, and upon which the principal parts of the apparatus are supported.

B is a bed resting upon the bed-plate A⁴, and it may be supported by anti-friction rollers, as shown by dotted lines at $b$, and to this bed B the vertical frame B' is either bolted or cast in one, and this vertical frame B' passes into the jaw B², that is supported by the frame A², so that the vertical frame B' and the parts connected with it can be moved backward and forward upon the bed-plate A⁴.

The casting C, in which are the oil-cylinders, is bolted to the frame B', and can be moved with it, and the flanges A⁵ of the bed-plate A⁴ serve as guides, between which the casting C may move.

At one side of the casting C is a hinge-block, C', to which the swing-frame C² is connected by the pivot-bolt c. This swing-frame C² corresponds generally to the vertical frame B', and to one side of it is the supporting-plate C³, that rests upon the bed-plate A⁴. The spring c² tends to swing the frame C² away from the B', and there may be a stop at c³, to prevent the frames C² coming too close to the frame B' under the action of the mechanism that forces them toward each other, as hereinafter described.

Upon the frame B' there are journal-bearings d d' for the vertical shaft D, and D' is the traction-wheel at the lower end of the vertical shaft D. (See Fig. 3.) Upon the swing-frame C² are the journal-bearings e e' for the vertical shaft E, at the lower end of which is the traction-wheel E'. These traction-wheels D' E' are grooved for the reception of the traveling cable F. I have shown two grooves in each wheel, one of which is faced with leather or similar yielding material. These wheels may be of any desired character and adapted to grasping the traveling cable.

Upon the respective shafts D E are the wheels D² and E², and to these a frictional device of any suitable character might be applied to check the rotation of the traction-wheels when the car is to be propelled, or the reverse, as the parts next described may be made use of with the cylinders and pistons and the valves for regulating the passage for the oil or other liquid from one end of the cylinder to the other, as before mentioned; or they may be used with any suitable mechanism for detaining or checking the rotation of the traction-wheels.

G is a bed-piece having a jaw, g, at one end, with a pivot-pin connecting the bed-piece to one side of the journal-bearing e, and at the outer end of this bed-piece G is a link, G', preferably double, with a pivot-pin, 2, at one end connecting the link G' to the other of the bed-piece G, and at the other end a pivot-pin, 3, connecting the link G' to the lever-link G², that is pivoted at 4 to the supporting-plate C³, and at the outer end of the lever-link G² is a link, G⁴, pivoted at 5 to G² and at 6 to a cross-bar, H, that is beneath and attached to the bed-plate A⁴. Similar appliances are provided at the other side of the apparatus, the bed-piece I having a jaw, i, at one end hinged to the journal-bearing d, and at the other end provided with a link, I', with a pivot-pin, 7, at one end and 8 at the other end, and a lever-link, I², pivoted at 9 to the bed B, and the link I⁴ is pivoted at 10 to the lever-link I² and at 11 to the cross-bar H.

It will now be apparent that when the traction-wheels D' E' and frames B' C² are moved backward and forward, as hereinafter described, the bed-pieces G and I, with their jaws g and i, will swing upon the joints by which they are connected to the journal-bearings d and e, and the extent of movement given to the pivots 2 and 7 will depend upon the points at which the links G' and I' are connected to the respective lever-links G² I², because the cross-bar H being a fixture the links G⁴ I⁴ only swing upon the pivots 6 and 11, respectively, and the pivots 4 and 9 receive a motion that is due to the end movement of the frames B' C²; hence, if the pivot-pins 3 and 8 are moved into the holes in the lever-links G² I² that are nearest to the pivots 4 and 9, the swinging motion given to the bed-pieces G and I will be but small, while if the pivot-pins 3 and 8 are moved outwardly into the holes that are nearest to the pivots 5 and 10 the swinging motion given to the bed-pieces G and I will be increased. It will be apparent that these bed-pieces G and I become levers, having the connections to the links M M' as pivots, and the gripping devices will be pressed upon the cable by the leverage of these bed-pieces G and I, and the force with which the cable is gripped will depend upon the load drawn, because the load is drawn by the link-connections at the ends of these lever bed-pieces G I, and the gripping action is the same, whether the car is moved in one direction or the other.

Upon the bed-piece I is a link-frame, K, formed of two slotted side pieces, k, that are connected together by the portion of the link-frame that is above the bed-piece I, and these slotted side pieces are guided by the plates 12, that extend out at opposite sides from the bed-piece I, and there is a toggle, L, the ends of which are pivoted to the jaw i and the link-frame K, respectively, and this toggle is raised up or pressed down by the toggle-link L', that receives its motion from a crank-shaft, L², supported in bearings L³ upon the frame A², and L⁴ is a hand-lever by which the said shaft L² can be turned and the toggle L either straightened out into the position shown in Fig. 3, or the center thereof raised to draw the link-frame K toward the jaw i.

Upon the bed-piece G is a second link-frame, K², having slotted side pieces k², guided by plates upon the sides of the bed-piece G, and between the slotted side pieces k² and the slotted side pieces k are the links M and M', the ends of which are slotted for the passage of pivot-pins that connect the links M M' to the respective slotted side pieces. Between the link-frame K² and the jaw g is an expansive helical spring, N.

It is now to be understood that when the hand-lever L⁴ is moved and the crank-shaft L² turned the toggle L will act to draw the traction-wheel E' toward the traction-wheel D', the frame C² swinging with the wheel E' and the parts connected to the same. This movement is the result of the toggles L being straightened and pushing the link-frame K away from the jaw $i$, and by the links M M' drawing the link-frame K² toward the jaw $g$, and by the intervening spring N causing said jaw $g$ to press against the journal-bearing $e$ of the swing-frame C². The parts are made and adjusted in such a manner that this movement will grip the traveling cable F; but the force with which the cable is gripped will depend upon the weight or resistance of the car to be drawn along, because the cable itself will communicate to the frames B' and C² an end motion, carrying with them the parts that are connected with such frames, including the traction-wheels, their shafts, and the jaws $g$ and $i$, and the movement thus given will swing the bed-pieces G I upon such jaws into a more or less inclined position, as indicated in Fig. 14, and the link M or M' holding the link-frames K and K² so that they cannot separate causes an increase of pressure through the spring N upon the bearings of the traction-wheels as the parts swing to the extent of motion due to the inclined position that the bed-pieces G and I assume in consequence of their outer ends being acted upon by the respective links and lever-links.

It will be apparent that the link M prevents the link-frames separating as the parts swing into the inclined position shown in Fig. 14, and the slots in the link M' allow of the swinging movement, and when the parts may be moved in the opposite direction the link M' ties the link-frames K and K² together, and the slots in the link M allow the link-frames to swing into the inclined position. In either instance the bed-pieces G and I become right-angle levers, and the connections between the link-frames and the link M (or M') become the pivots upon which these bed-pieces swing in pressing the gripping devices firmly upon the traveling cable or its equivalents.

It will be apparent that if the crank-pins O O' upon the wheels D' and E', respectively, receive the connecting-rods from a steam-engine or other motor the traction-wheels D' E' might be revolved and the cable F remain stationary; or, in place of said cable, a stationary rail might be made use of, as indicated by dotted lines, Fig. 3, the other parts remaining unchanged and acting in the manner before described; and I also remark that the toggle mechanism, the bed-pieces G and I, link-frames K K², and the links and link-levers before described may be made use of and act in the manner before described, if rigid clamps upon the respective frames B' C², as indicated by dotted lines in Fig. 4, be made use of in place of the traction-wheels.

When the crank-shaft L² is turned by the hand-lever L⁴ and the toggles L are pressed down into line, the center joint of the toggles is to pass slightly below a line passing through the end joints, in order that the pressure may tend to hold the toggles firmly down upon the bed-piece I, and it is necessary that the end movement given to the frames B' and C² and the parts carried by them may be free without any tendency to lift the center joint of the toggles. For this reason the eye of the top end of the toggle-link is free to slide upon the crank of the shaft L², and this crank is made sufficiently long, as indicated in Fig. 1, to allow for the said movements of the parts.

I provide a lever, P, pivoted at $p$ to the main frame A², and there are links P² extending from the lower end of the lever P to a block, $p'$, upon the supporting plate C³. By means of this lever P and links P² the plate C³, swing-frame C², casting C, and vertical frame B', and the parts carried by them, can be moved endwise by hand-power applied to said lever P. The object of this is twofold: First, the parts may be brought back to the position of rest indicated in Fig. 1, even while the car is in motion, in order that the toggles may be either applied or taken off to grip or release the cable with the greatest facility; or, second, in instances where the grip of the traction-wheels upon the cable is insufficient this lever P can be made use of to augment the endwise movement given to the frames B' C² and parts carried by them to cause the links and lever-links to swing the bed-pieces G and I and increase the pressure applied to the cable, or its equivalent.

In cable railways the grip has to be released when passing by an intersecting cable. This can be done by hand applied to the lever P; but it is preferable to avoid the risk of the grip retaining its hold upon the cable by liberating the grip automatically. With this object in view I provide a cam-lifter, Q, pivoted at Q' upon the frame A², and I place upon the cross-ties adjoining the track an incline, Q², over which the cam-lifter Q passes, and the raising of the cam-lifter Q gives motion by the foot Q³ to the lever L⁴, moving the crank-shaft L² and liberating the toggles, and allowing the frames B' C² and traction-wheels to separate sufficiently to drop the cable F. After the cable has been lifted by any suitable appliance, so as to pass in between the traction-wheels D' E', the lever L⁴ is moved to straighten the toggles and grip the cable, as aforesaid.

Upon the vertical shafts D and E there are cranks at right angles to each other. The pins O O' form the cranks at the upper ends of the respective shafts, and at O² O³ the cranks are formed in the shafts themselves. Upon reference to the diagram, Fig. 12, it will be seen that the cranks O and O² are at right angles to each other. So, also, are the cranks O' and O³. From the cranks O O' the connecting-rods R R' pass to the cross head S, that slides upon the bars or guides T, and from the cranks O² O³ the connecting-rods R² R³ pass to the cross-head S', that slides upon the bars or guides T'. These bars or guides T T' are fastened at one end to a frame, T², bolted upon the vertical frame B', and at the other end said bars or guides are connected to the cylinder-heads T³.

It will now be apparent that as the shafts D E are revolved the cross-heads S S' are moved backward and forward, and when one pair of cranks, O² O³, are passing the center the other pair of cranks, O O', at right angles are acting with their full force; hence the movements are equalized, and, in addition to this, the two traction-wheels D' E' are revolved with uniformity, and one cannot slip upon the cable or its equivalent unless the other slips at the same time; hence the risk of injury is very materially lessened.

To the respective cross-heads S S' are connected the piston-rods U U' and pistons U² U³, which are within the cylinders in the casting C. If steam or air under pressure should be admitted to these cylinders by any suitable valves to act upon the pistons U² U³, the entire apparatus heretofore described might be made use of as a motor, the cable F, or its equivalent—a rail—being stationary for the traction-wheels D' E' to act upon, and in order to more fully protect my invention I have made a separate application for patent on separate features that are not necessarily confined to the cable-traction apparatus.

When this invention is made use of with a traveling cable, the cylinders in the casting C are to contain oil or other suitable liquid supplied through the oil-cups u u', which lead into the respective cylinders and passage-ways. These oil-cups are provided with cocks to confine the oil. I remark that the oil may be pumped in or supplied in any other suitable manner, care being taken to displace all the air, so that the cylinders and passage-ways are entirely filled with the liquid, and this is to be renewed from time to time as the same may be lost by leakage or otherwise. Passage-ways V V' are provided for each cylinder, with branches or ports leading into the cylinders at opposite ends, and in each passage-way is a valve or cock, by which the same can be partially or entirely closed. I have shown one plug or cock, W, having two cross-holes through it, corresponding to the respective passage-ways V V', and there is a lever or handle, W', by means of which the plug can be rotated and the passage-ways opened or closed. When the cock W is open, the liquid circulates freely through the passage-ways V V' as the pistons U² U³ are reciprocated. If the cock W is closed, the pistons cannot move, because the liquid cannot be compressed, and when the cock is partially opened a resistance is offered to the movements of the parts, and this resistance can be graduated at will, so that the speed of the car can be regulated to any desired extent. If the cock W is opened, the car can stand still, and the pistons U² U³ will be reciprocated and the liquid will churn back and forth through the passage-ways V V', and upon starting the car the cock W is gradually and partially closed. If the car is to be driven at the same speed as the traction-cable, the cock W is closed as soon as the inertia of the car can be overcome; but if the car is to travel at a less speed than the cable the cock W is left partially opened, and the speed of the car will be in proportion to the resistance offered by the liquid to the movements of the piston.

It will be apparent that the gripping mechanism acts in the same manner when the car is moving in either direction, and that the car containing the grip does not have to be turned end for end on a turn-table, but is run off from one track upon the other at the end of the line and the cable moving in the opposite direction is picked up and the car run the other way. So, also, in going uphill, the leverage action to grip the cable in proportion to the weight that is being drawn along will tend to move the gripping devices toward the front of the car and grip the cable in proportion to the traction-power, and in going downhill the grip cannot slip upon the cable, but the cable will hold back the cars and regulate their speed, because the tendency of the cars to press forward causes the gripping devices to assume a position nearer to the rear of the car, swinging the levers upon the respective joints and gripping the cable in proportion to the weight to be resisted.

I have illustrated in Fig. 15 the manner in which the grip can be made to take a longer bearing upon the cable. In this instance I have shown three pairs of gripping-wheels D' E', with the respective shafts, bed-pieces, link-frames, and links to each shaft. When pairs of wheels are arranged in this manner, it is necessary to connect the outer ends of the respective bed-pieces G by links, as shown, in order that they may be moved together in either one direction or the other to act upon and grip the cable, and by the extended bearing upon said cable lessen the risk of injury to the surface of the same or to the surfaces of the wheels.

I claim as my invention—

1. The combination, with the frames B' and C² and the traction-grip upon the same, of the bed-pieces I G, with jaws by which they are pivoted at their inner ends, the link-frames K K², the links M M', for connecting the link-frames, and the links G' I', connected to the respective bed-pieces G and I, for swinging the same and the link-frames into an inclined position to the frames B' and C², and thereby applying the grip, substantially as set forth.

2. The combination, with the frames B' and C² and the gripping devices carried by the same, of the bed-pieces G and I, pivoted at their inner ends, the link-frames K and K², sliding upon the pieces G and I, the links M M', for connecting the link-frames, the spring N, and the toggles L, substantially as set forth.

3. The combination, with the frames B' C², capable of receiving an endwise movement, of the shafts D E, the traction-wheels D' E', supported by such frames, the bed-pieces G and I, pivoted at their inner ends to the frames, the link-frames K K², the links M M', connecting the link-frames, and the links G' I', connected to the outer ends of the bed-pieces G and I, substantially as specified, whereby the wheels E' D' are caused to grip the cable or its equivalent in proportion to the load to be moved, substantially as set forth.

4. The frames B' C² and the shafts D and E, supported by the same, the traction-wheels D' E', the bed-pieces G and I, link-frames K K², links M M', for connecting the link-frames, the spring N between the link-frame K² and the jaw g, and the toggles L between the link-frame K and the jaw i, and the links I' and G', substantially as set forth.

5. The combination, with the wheels A, frame A², and bed-plate A⁴, of the bed B, adapted to slide upon the frame A², and the vertical frame B', connected to the bed B, the supporting-plate C³ and swinging frame C², connected to and moving with the bed B and frame B', the shafts D and E, sustained by the respective frames B' and C², the traction-wheels D' E', and mechanism, substantially as specified, for pressing the wheel E' toward the wheel D' and grasping the cable or its equivalent, and the cranks, connecting-rods, and cross-heads, substantially as set forth.

6. The combination, with the traction-wheels and the frames for supporting the same, of the bed-pieces G I, hinged to the respective supporting-frames, and the links G' I', lever-links G² I², links G⁴ I⁴, and connection H to the truck or car frame, and the link-frames K K², and connecting mechanism, substantially as specified, for applying the traction-wheels D' E' to the cable or its equivalent with a gripping pressure resulting from the action of the load to be drawn tending to swing the bed-pieces G and I into inclined positions, substantially as set forth.

7. The combination, with the traction-wheels D' E' and their respective shafts and cranks, of connecting-rods, cross-heads, piston-rods, piston, and cylinders adapted to contain oil or other fluid, and valves or cocks in the ports that connect the ends of the respective cylinders, whereby the revolution of the traction-wheels is controlled or arrested, according to the positions of the valves or cocks, substantially as set forth.

8. The combination, with the truck and wheels and the frames B' C², of the traction-wheels, bed-pieces G I, hinged to the frames C² B', the link-frames K K², links M M', toggles L, toggle-link L', crank-shaft L², and lever L⁴, substantially as specified.

9. The combination, with the truck and wheels and the frames B' C², of the traction-wheels, bed-pieces G I, hinged to the frames C² B', the link-frames K K², links M M', toggles L, toggle-link L', crank-shaft L² and lever L⁴, foot Q³, cam-lifter Q, and incline Q⁵, substantially as set forth.

10. The combination, with the frames B' C² and the bed B and supporting-plate C³, of the hinge-block and hinge upon which the frame C² swings, the mechanism carried by the respective frames B' C², respectively, substantially as specified, for clamping the traction-cable, the bed-plate A⁴, for supporting the parts, the links that connect the bed-plate A⁴ to the bed-pieces G and I of the gripping mechanism, and the lever P and links P², for moving the frames B' C² endwise and increasing or lessening the grip upon the cable, substantially as set forth.

11. The combination, with the cable and gripping devices, of levers at each side of the cable, a link connecting the fulcra of such levers together, and links between the outer ends of such levers and the car, substantially as and for the purposes set forth.

12. The combination, with the cable and the gripping devices, of levers at opposite sides of the cable, two links for connecting the fulcra of the levers on one side to the fulcra of the levers on the other side, and connections from the outer ends of the levers to the cars, whereby the resistance in moving the cars either in one direction or the other applies the leverage to the gripping devices, substantially as specified.

Signed by me this 12th day of December, A. D. 1885.

J. H. PENDLETON.

Witnesses:
GEO. T. PINCKNEY,
WALLACE L. SERRELL.